United States Patent [19]

Nakagaki et al.

[11] Patent Number: 4,575,760
[45] Date of Patent: Mar. 11, 1986

[54] NOISE REDUCTION CIRCUIT FOR A VIDEO SIGNAL

[75] Inventors: Shintaro Nakagaki, Fujisawa; Ichiro Negishi, Tokyo, both of Japan

[73] Assignee: Victor Company of Japan Ltd., Yokohama, Japan

[21] Appl. No.: 596,551

[22] Filed: Apr. 4, 1984

[30] Foreign Application Priority Data

Apr. 7, 1983 [JP] Japan .................................. 58-61295
Jul. 27, 1983 [JP] Japan ........................... 58-116851[U]

[51] Int. Cl.$^4$ ............................................. H04N 5/213
[52] U.S. Cl. ...................................... 358/167; 358/36
[58] Field of Search ................. 358/167, 36, 155, 177, 358/905, 336, 340; 455/296, 302, 303

[56] References Cited

U.S. PATENT DOCUMENTS 4,443,817  4/1984  Faroudja ............................. 358/167

FOREIGN PATENT DOCUMENTS 211885  12/1982  Japan .................................. 358/167
2950465  9/1982  Fed. Rep. of Germany .
156479  12/1980  Japan .

Primary Examiner—Tommy P. Chin
Attorney, Agent, or Firm—Michael N. Meller

[57] ABSTRACT

A noise reduction circuit for a video signal, comprises a delay circuit for delaying an input video signal by a predetermined delay time which is m times one horizontal scanning period, where m is an integer including one, a first adding circuit for adding the input video signal and the delayed video signal, a subtracting circuit for performing a subtraction between the input video signal and the delayed video signal, a noise clipping circuit for eliminating a noise component which is multiplexed at a zero level of an output signal of the subtracting circuit, and for producing a signal having a waveform corresponding to a correlation error which is introduced in an output signal of the first adding circuit due to the addition performed in the first adding circuit, and a second adding circuit for adding the output signals of the first adding circuit and the noise clipping circuit so as to produce a video signal in which the correlation error has been compensated and the noise has been reduced.

6 Claims, 4 Drawing Figures

NOISE REDUCTION CIRCUIT FOR A VIDEO SIGNAL

BACKGROUND OF THE INVENTION

The present invention generally relates to noise reduction circuits for a video signal, and more particularly to a noise reduction circuit which carries out a signal processing so as to effectively reduce a noise without deteriorating the waveform of an original video signal.

Generally, a video information signal of a television video signal has a correlation substantially in a vertical direction of a picture, and there is a correlation between mutually adjacent horizontal scanning lines. Such a correlation is generally referred to as a vertical correlation or a line correlation. However, a noise component exists at random, and does not have a vertical correlation as in the case of the video information signal.

Thus, there was a conventional noise reduction circuit which was designed to use the fact that there is the vertical correlation in the video information signal and no vertical correlation in the noise component, in order to reduce the noise. This conventional noise reduction circuit was made up of a delay circuit for delaying an input video signal by one horizontal scanning period (1H), and an adding circuit for adding an output delayed video signal of the delay circuit and the input video signal which has not been delayed. When the delayed video signal and the undelayed video signal are added in the adding circuit, the level of the signal component is doubled by the addition because there is the vertical correlation in the video information signal. However, since there is no vertical correlation in the noise component, the energy of the noise component is root-mean-squared by the addition. In other words, the level of the noise component becomes $\sqrt{2}$ times the original level before the addition. Accordingly, when the level of the signal component after the addition is returned to the original level before the addition, the noise component becomes $1/\sqrt{2}$ times the original level, and the signal-to-noise (S/N) ratio is improved by 3 dB.

However, although there generally is the vertical correlation in the video signal, there is no vertical correlation before and after a point where the waveform of the video signal undergoes a rapid change (for example, in an extreme case, a point where the video signal changes from white to black). In this case, the level of the video signal does not become doubled in the output video signal of the above adding circuit which adds the delayed video signal and the undelayed video signal, at parts of the video signal where the vertical correlation does not exist. Thus, stepped parts are introduced in the waveform at the parts where the vertical correlation does not exist, and the output video signal waveform of the adding circuit becomes different from the original video signal waveform. The part of the video signal waveform where there is no vertical correlation, which becomes different from the original video signal waveform as a result of the signal processing which is carried out to reduce the noise, will be referred to as a correlation error in the present specification. When the correlation error occurs, the luminance and color at the part of the video signal where the correlation error has occurred, become different from the luminance and color at a corresponding part of the original video signal. Therefore, the conventional noise reduction circuit was disadvantageous in that it was impossible to obtain a satisfactory reproduced picture although the noise could be reduced.

SUMMARY OF THE INVENTION

Accordingly, it is a general object of the present invention to provide a novel and useful noise reduction circuit for a video signal, in which the disadvantages described heretofore have been overcome.

Another and more specific object of the present invention is to provide a noise reduction circuit for a video signal, which is designed to compensate for a correlation error and consequently obtain an output video signal which has no correlation error, which has the same signal waveform as the original video signal, and in which the noise has been reduced.

Still another object of the present invention is to provide a noise reduction circuit for a video signal, which is designed to subject the above output video signal which has been reduced of the noise, to a positive feedback to an input side of the circuit. According to the circuit of the present invention, the correlation error will not occur, and the noise can be more effectively reduced.

Other objects and further features of the present invention will be apparent from the following detailed description when read in conjunction with the accompanying drawings.

DETAILED DESCRIPTION

Figure 1:
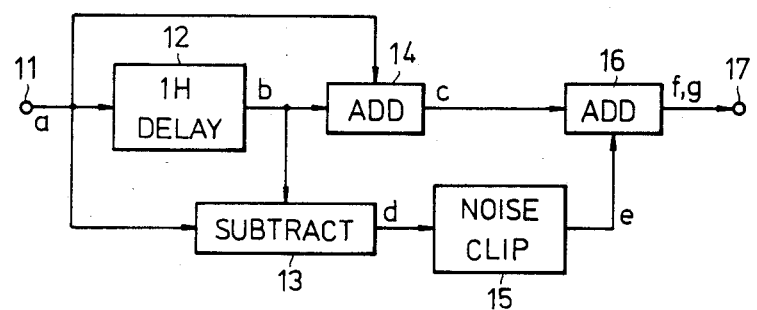
FIG. 1 is a systematic block diagram showing a first embodiment of a noise reduction circuit for a video signal according to the present invention.
Figure 3:
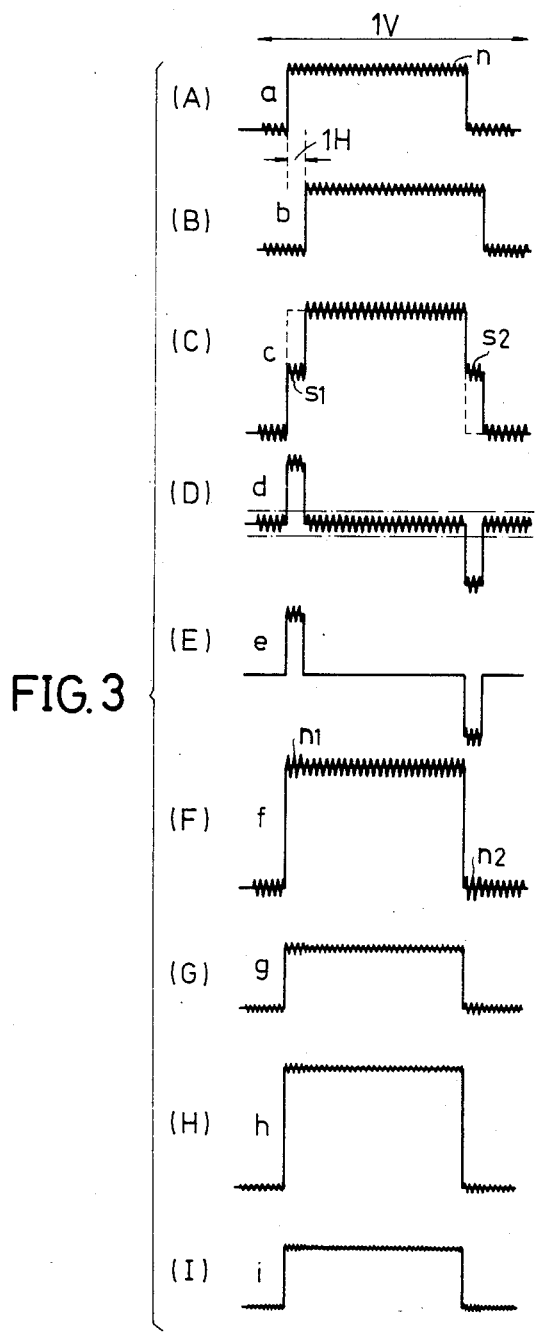
FIGS. 3(A) through 3(I) show signal waveforms at each part of the block systems shown in FIGS. 1 and 2.
Figure 4:
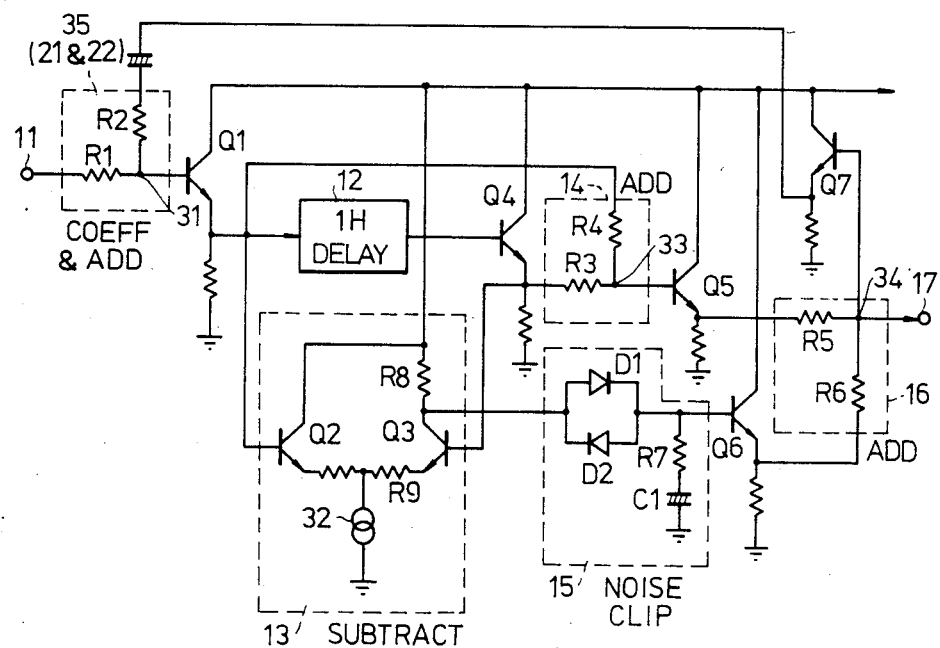
FIG. 4 is a circuit diagram showing an embodiment of a concrete circuit construction of the block system shown in FIG. 2.

A first embodiment of a noise reduction circuit for a video signal according to the present invention will be described in conjunction with FIG. 1. A video signal a shown in FIG. 3(A), in which a noise has been multiplexed, is applied to an input terminal 11. The video signal a from the input terminal 11 is supplied to a 1H delay circuit 12, a subtracting circuit 13, and an adding circuit 14. The video signal a which is supplied to the 1H delay circuit 12, is delayed by 1H, where 1H represents one horizontal scanning period, and is produced as a delayed video signal b shown in FIG. 3(B). This delayed video signal b is supplied to the subtracting circuit 13 and to the adding circuit 14. In FIG. 3, the duration of 1H is exaggerated and shown as a long duration with respect to 1V which represents one vertical scanning period.

The video signal a and the delayed video signal b are added in the adding circuit 14. The adding circuit 14 produces an added signal c shown in FIG. 3(C), and supplies this added signal c to an adding circuit 16. The level of the added signal c is doubled at parts which correspond to the parts of the video signal a and the delayed video signal b where there is the vertical correlation. However, because a noise component n does not have the vertical correlation, the level of the noise component n in the added signal c is root-mean-squared, and becomes $\sqrt{2}$ times the original level of the noise component n. There is, however, no vertical correlation before and after a leading edge and a trailing edge of a video signal component in the video signal a. Thus, the added signal c which is obtained by adding the video signal a and the delayed video signal b, has a correlation error at the leading and trailing edge parts thereof. In other words, the level of the added signal c does not become doubled at the leading and trailing edge parts thereof, and stepped parts $s_1$ and $s_2$ are formed at these leading and trailing edge parts. Accordingly, in the noise reduction circuit of the present invention, the correlation error is compensated as will be described hereinafter.

The subtracting circuit 13 subtracts the delayed video signal b from the video signal a, and produces a signal d shown in FIG. 3(D). This signal d has a waveform corresponding to the correlation error described before, and the noise component is multiplexed in this signal d. The signal d is supplied to a noise clipping circuit 15 wherein the noise component which is multiplexed at the average level (zero level) of the signal d is eliminated. The noise clipping circuit 15 produces a signal e shown in FIG. 3(E) which has a waveform corresponding only to the correlation error. The noise clipping circuit 15 is designed to pass a signal over a predetermined level, which is indicated by a one-dot chain line in FIG. 3(D), and to block a signal under the predetermined level. Thus, the noise component which is multiplexed at the average level of the signal d, is eliminated in the noise clipping circuit 15. The output signal e of the noise clipping circuit 15 is supplied to the adding circuit 16 as a correlation error compensating signal.

The signal c from the adding circuit 14 is added to the correlation error compensating signal e from the noise clipping circuit 15, in the adding circuit 16. Thus, the parts of the signal c where the correlation error exists, that is, the stepped parts $s_1$ and $s_2$, are compensated by the correlation error compensating signal e as indicated by a broken line in FIG. 3(C). As a result, the adding circuit 16 produces a signal f having a waveform shown in FIG. 3(F). The level of the video information in the signal f is double the level of the video information in the video signal a. Furthermore, the signal f has been compensated by the correlation error, and includes no stepped parts. With respect to the noise component in the signal f, the noise is not reduced at slight noise parts $n_1$ and $n_2$ of 1H which corresponds to the delay time in the 1H delay circuit 12, but the level of the noise is $\sqrt{2}$ times the original level at other parts. Accordingly, when the level of the whole signal f is divided by $\frac{1}{2}$ so that the level of the signal component becomes the same as the level of the signal component in the video signal a, an output video signal g shown in FIG. 3(G) is obtained. As shown in FIG. 3(G), the waveform of the video information signal in the output video signal g is the same as the waveform of the video information signal in the video signal a, and includes no correlation error. Moreover, the level of virtually all the noise component has been reduced to $1/\sqrt{2}$ times the original level, in the output video signal g. The signal f is illustrated simply for the sake of convenience and the signal g may be obtained by dividing the levels of the signals c and e by $\frac{1}{2}$ and adding the level divided signals in the adding circuit 16. Therefore, the level of the noise component in the output video signal g has been reduced to virtually $1/\sqrt{2}$ times the original level, that is, the S/N ratio has been improved by 3 dB. In addition, the output video signal g includes no correlation error with respect to the video information signal component, and has the same video information signal component as the original input video signal a. This output video signal g is produced through an output terminal 17.

Figure 2:
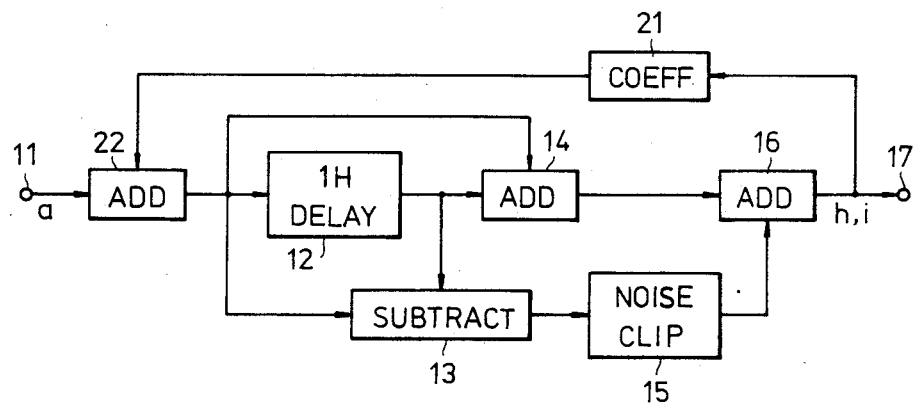
FIG. 2 is a systematic block diagram showing a second embodiment of a noise reduction circuit for a video signal according to the present invention.

Next, description will be given with respect to a second embodiment of a noise reduction circuit for a video signal according to the present invention, by referring to FIG. 2. In FIG. 2, those parts which are the same as those corresponding parts in FIG. 1 are designated by the same reference numerals, and their description will be omitted.

In FIG. 2, the input video signal a from the input terminal 11 is supplied to the 1H delay circuit 12, the subtracting circuit 13, and the adding circuit 14. The operations of the 1H delay circuit 12, the subtracting circuit 13, the adding circuit 14, the noise clipping circuit 15, and the adding circuit 16 are the same as in the first embodiment described before in conjunction with FIG. 1.

The output signal of the adding circuit 16 is supplied to an adding circuit 22, through a coefficient multiplier 21 which multiplies a coefficient $\beta$. In other words, the adding circuit 22 receives a positive feedback from the adding circuit 16. The output signal of the adding circuit 16, which has been multiplied with the coefficient $\beta$, is added with the input video signal a in the adding circuit 22. An output signal of the adding circuit 22 is subjected to a noise reduction process in a noise reduction circuit which is the same as in the first embodiment described before and comprises the circuits 12 through 16. Because an operation in which the signal which has been subjected to the noise reduction process is positively fed back and again subjected to a noise reduction process is repeated, an output video signal h shown in FIG. 3(H) (that is, an output video signal i shown in FIG. 3(I)) is obtained through the output terminal 17. As shown in FIG. 3(H) (FIG. 3(I)), the noise has been greatly reduced in the output video signal h (i).

The following equations (1) and (2) apply when it is assumed that a noise component $N_{in}$ is multiplexed in the input video signal a, a noise component $N'$ is multiplexed in the output signal of the adding circuit 22, and a noise component $N_{out}$ is multiplexed in the output signal i.

$$\sqrt{(1-\beta)^2 N_{in}^2 + \beta^2 N_{out}^2} = N' \quad (1)$$

$$N_{out} = (1/\sqrt{2})N' \quad (2)$$

The following equation (3) can be formed from the above equations (1) and (2).

$$N_{in}/N_{out} = \sqrt{2 - \beta^2}/(1-\beta) \quad (3)$$

From the above equation (3), the noise improvement achieved by the noise reduction circuit according to the present invention, can be described by the following equation (4).

$$20\log N_{in}/N_{out} = 20\log \sqrt{2 - \beta^2}/(1-\beta) \quad (4)$$

Accordingly, when the value of the coefficient $\beta$ is tion $G_1 \approx R_2/R_1$, and a voltage gain $G_2$ when the diode a second adding circuit supplied with the output signal of said first adding circuit and an output signal of said noise clipping circuit, for adding the output signals of said first adding circuit and said noise clipping circuit so as to produce a video signal in which the correlation error has been compensated and the noise has been reduced; and coefficient multiplying and adding circuit means for multiplying a predetermined coefficient $\beta$ and the output video signal of said second adding circuit and for adding the multiplied signal to said input video signal, said delay circuit, said first adding circuit, and said subtracting circuit being respectively supplied with an output signal of said coefficient multiplying and adding circuit means.

2. A noise reduction circuit as claimed in claim 1 in which the noise level in the output video signal of said second adding circuit, is $1/\sqrt{2}$ times the noise level in said input video signal.

3. A noise reduction circuit as claimed in claim 1 in which said coefficient multiplying and adding circuit means comprises a multiplier for multiplying said predetermined coefficient $\beta$ to the output video signal of said second adding circuit, and a third adding circuit for adding an output signal of said multiplier and said input video signal.

4. A noise reduction circuit as claimed in claim 1 in which said coefficient multiplying and adding circuit means comprises a coefficient multiplying and adding circuit which is made up of a first resistor of a resistance $R_1$ supplied with said input video signal, and a second resistor of a resistance $R_2$ supplied with the output signal of said second adding circuit, said first and second resistors are commonly coupled at an adding point, and said output video signal of said second adding circuit is multiplied by said coefficient $\beta$ satisfying an equation $\beta = R_1/(R_1 + R_2)$ and added with said input video signal at said adding point.

5. A noise reduction circuit as claimed in claim 1 in which said second adding circuit produces a video signal which has been reduced of the noise by a noise improvement described by $$20\log \sqrt{2 - \beta^2}/(1 - \beta).$$

6. A noise reduction circuit as claimed in claim 1 in which said subtracting circuit comprises a differential amplifier which includes a pair of transistors, said noise clipping circuit comprises a circuit which includes a pair of diodes coupled in parallel with mutually opposite polarities, and one of said pair of transistors coupled to said pair of diodes also acts to compensate for a nonlinear operating characteristic of a circuit which includes said pair of diodes.

* * * * *